United States Patent [19]

Young et al.

[11] 4,383,878

[45] May 17, 1983

[54] TRANSFER PROCESS

[75] Inventors: Chung-I Young, Roseville; Brian H. Williams, White Bear Lake, both of Minn.

[73] Assignee: Minnesota Mining and Manufacturing Company, St. Paul, Minn.

[21] Appl. No.: 151,643

[22] Filed: May 20, 1980

[51] Int. Cl.³ .............................................. B44C 3/02
[52] U.S. Cl. ................................... 156/235; 156/237; 156/241; 156/249; 156/289; 427/289
[58] Field of Search .................... 427/146, 147, 44; 156/241, 237, 235, 241, 249, 289

[56] References Cited

U.S. PATENT DOCUMENTS

| | | | |
|---|---|---|---|
| 2,302,179 | 11/1942 | Bronfman | 101/426 |
| 2,558,803 | 7/1951 | Wittgren | 427/146 |
| 2,642,416 | 6/1953 | Ahlbrecht et al. | 260/33.5 |
| 2,803,615 | 8/1957 | Ahlbrecht et al. | 260/29.6 |
| 2,819,196 | 1/1958 | Munro | 154/103 |
| 3,043,732 | 7/1962 | Shepherd | 156/230 |
| 3,068,187 | 12/1962 | Bolstad et al. | 260/29.6 |
| 3,099,558 | 7/1963 | Levinos | 96/35 |
| 3,102,103 | 8/1963 | Ahlbrecht et al. | 260/29.6 |
| 3,146,144 | 8/1964 | Lemelson | 156/234 |
| 3,171,861 | 3/1965 | Ahlbrecht et al. | 260/633 |
| 3,240,642 | 3/1966 | Gaudio | 156/89 |
| 3,250,806 | 5/1966 | Moore et al. | 260/535 |
| 3,250,807 | 5/1966 | Fritz et al. | 260/535 |
| 3,275,436 | 9/1966 | Mayer | 96/1 |
| 3,376,182 | 4/1968 | Borell et al. | 156/235 |
| 3,384,627 | 5/1968 | Anello et al. | 260/89.5 |
| 3,419,602 | 12/1966 | Pittman et al. | 260/486 |
| 3,490,362 | 1/1970 | Massari | 101/28 |
| 3,505,229 | 4/1970 | Skehan | 252/54 |
| 3,607,526 | 9/1971 | Biegen | 156/235 |
| 3,676,248 | 7/1972 | Swartz | 156/241 |
| 3,699,145 | 10/1972 | Siasesi et al. | 260/244 |
| 3,716,360 | 2/1973 | Fukushima et al. | 96/1.4 |
| 3,719,698 | 3/1973 | Tesoro et al. | 260/445.8 R |
| 3,729,313 | 4/1973 | Smith | 96/27 |
| 3,791,905 | 2/1974 | Molner | 156/235 |
| 3,810,874 | 5/1974 | Mitsh et al. | 260/75 H |
| 3,810,875 | 5/1974 | Rice et al. | 260/899 |
| 3,814,741 | 6/1974 | Caporiccio et al. | 260/86.1 E |
| 3,818,074 | 6/1974 | Ahlbrecht | 260/486 |
| 3,833,384 | 9/1974 | Noonan et al. | 96/115 P |
| 3,838,104 | 9/1974 | Hayashi et al. | 260/63 HA |
| 3,882,193 | 5/1975 | Rice et al. | 260/874 |
| 3,885,964 | 5/1975 | Nacci | 96/35.1 |
| 3,887,450 | 6/1975 | Gilano et al. | 204/159.15 |
| 3,895,949 | 7/1975 | Akamatso et al. | 96/86 |
| 3,897,587 | 7/1975 | Molner | 428/409 |
| 3,975,352 | 8/1976 | Yoerger et al. | 260/33.8 F |
| 3,981,928 | 9/1974 | Tesoro et al. | 260/615 F |
| 4,037,021 | 7/1977 | Adams | 428/522 |
| 4,043,819 | 8/1977 | Baumann | 96/115 P |
| 4,058,401 | 11/1977 | Crivello | 96/115 R |
| 4,064,285 | 12/1977 | Mammino | 156/235 |
| 4,105,483 | 8/1978 | Lin | 156/235 |
| 4,171,398 | 10/1979 | Hunt | 428/195 |
| 4,201,810 | 5/1980 | Higashiguchi | 156/235 |
| 4,293,360 | 10/1981 | Loft et al. | 156/235 |

FOREIGN PATENT DOCUMENTS

| | | | |
|---|---|---|---|
| 730649 | 3/1966 | Canada | 427/147 |
| 906934 | 9/1962 | United Kingdom | 427/147 |
| 959670 | 6/1964 | United Kingdom | 427/147 |

*Primary Examiner*—Michael R. Lusignan
*Assistant Examiner*—Janyce A. Bell
*Attorney, Agent, or Firm*—Cruzan Alexander; Donald M. Sell; Jennie G. Boeder

[57] ABSTRACT

A method of transferring indicia from a first support base, such as a paper sheet, which is coated with a release agent, to a receiver surface, such as a wall or window. An adhesive surface is pressed against the first support base in order to transfer the indicia from the first support base to the adhesive surface. The adhesive bearing the indicia is then applied to a receiver surface to provide the receiver surface with a protected image. Preferably the indicia is a fused xerographic image and the release agent coated on the first support base is a unique radiation-curable fluorine-containing abherent coating composition.

23 Claims, 1 Drawing Figure

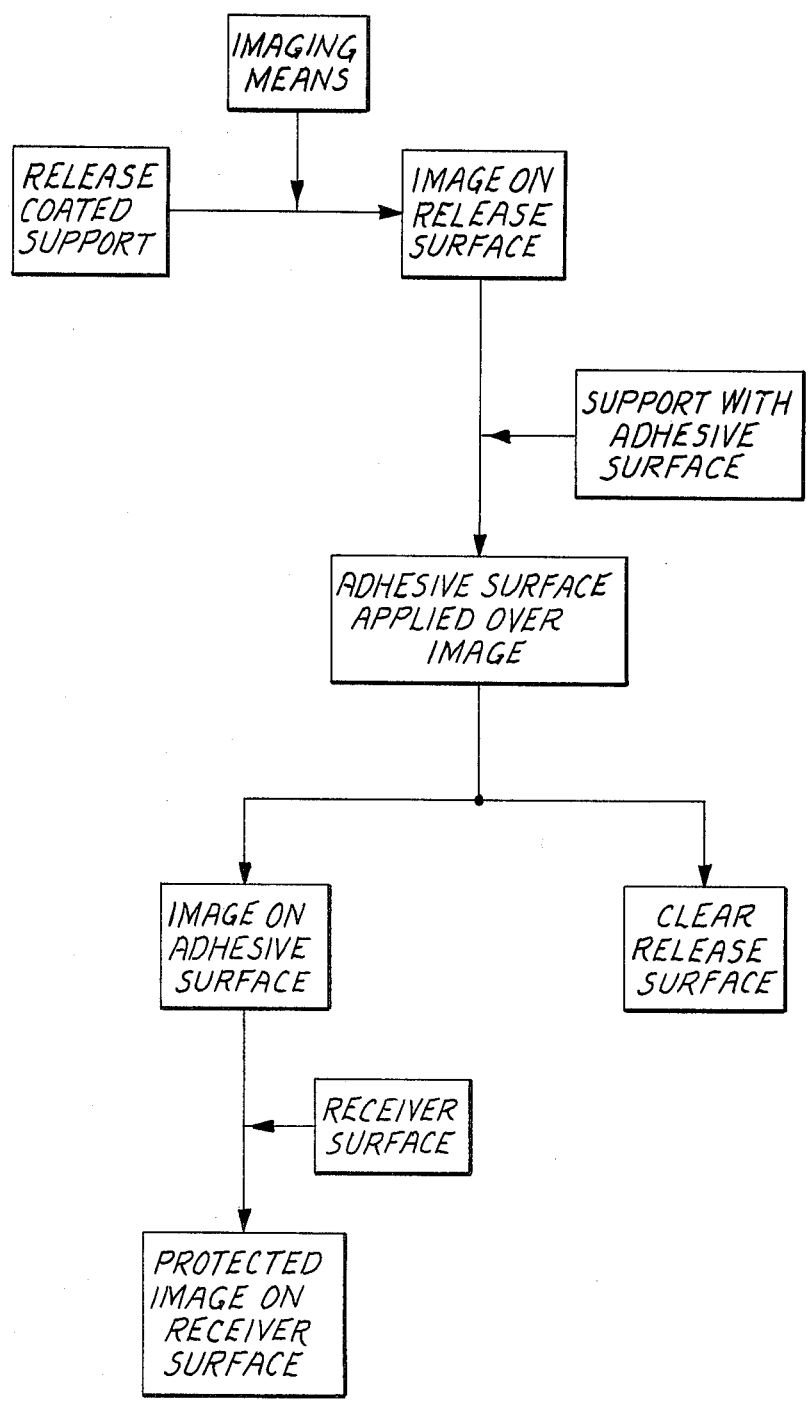

TRANSFER PROCESS

The present invention relates to a method for transferring a fused xerographic image from an original surface to another receiver surface. More particularly, the process of the present invention involves transferring a fused xerograhic image from a unique release surface to a pressure sensitive or latent adhesive surface of a suitable support, resulting in an image-protected article bearing pressure sensitive or latent adhesive for ready use on supports such as walls, windows, stats, or the like.

Transfers consisting of a carrier or backing sheet carrying an image which can be transferred from the backing to a further support are fundamentally well-known. The first such transfers required the application of water to release the image from the carrier or backing, which was usually a clay-coated paper. These transfer materials were usually difficult to make, complicated in construction, and difficult to store without deterioration. Further, after application there was frequently a yellowing of the nonopaque film which supported the image.

In current use are transfers from which the image can be transferred without the use of any liquid. These materials utilize either heat or pressure activated adhesive formulations whereby the images adhere to the subsequent display surface. With most of these prior art transfers the adhesive layer was interposed between the image and the supporting surface. Thus, frequently the unprotected image would blur or break in its application to the surface.

In several of the transfer adhesive systems of the prior art the information to be transferred is printed onto the pressure sensitive tapes. Applying a printing material to an adhesive surface has been unsatisfactory for reasons which include the tendency of the adhesive to cause the ink to spread or run. Alternatively, applying a printing material to the glazed backing of adhesive tapes has undesirably necessitated resort to the use of special print types, since commonly utilizing backing material is not readily printed upon due to its inability to hold a printed image.

In an effort to solve these problems printing material has been applied to a tape surface prior to coating the surface with an adhesive substance. The obvious disadvantage of preprinting the tape has rendered such a procedure generally unfeasible.

Moreover, because of the way that the transfers of the prior art are made, it is normally not practical for a user to prepare his own transfers. Many of the transfers of the prior art had to be prepared by specialty shops with special equipment. With the development of modern xerographic printing processes there has developed a need for a transfer wherein the user can prepare his own image and with it prepare his complete transfer.

The use of bond paper copiers to produce articles for the transferring of images represents a simpler and less expensive transfer process than has been provided by many of the systems of the prior art. Problems associated with the xerographic imaging of transfer surfaces are nonuniform image density, poor toner fusion and heat sensitivity of the transfer surfaces which results in curling and shrinking of the support substrate. In addition, abhesive materials such as silicones and fluorocarbons (i.e., Teflon®) have not been particularly useful as release coatings in image transfer systems where the image applied to the release surface is a fused xerographic one, since the image is easily smeared, such as by finger pressure. Therefore, it is desirable that a method be available that would allow use of a commercial bond paper copier to produce information which is transferable to various substrates without any of the above mentioned problems. It would also be desirable that the transferable information be protected to form a permanent and impervious record.

The figure is a flow diagram of the method of the present invention.

DISCLOSURE OF INVENTION

The present invention provides an image transfer system for transferring an image from a surface which has been coated with a release coating and the imaged onto a different receiver surface comprising the steps of:
  (a) applying a release coating to a first support base;
  (b) applying an image to the release coated surface of said first support base;
  (c) adhering an adhesive surface of an adhesive coated second support base over said image on said release coated surface of said first support base;
  (d) applying sufficient pressure to said second support base to effect intimate contact between said adhesive surface of said second support base and said image bearing release coated surface of said first support base;
  (e) separating said image bearing first support base from said second support base, with said image being transferred to said adhesive layer of said second support base; and
  (f) releasably securing said adhesive layer of said second support base, now bearing said image, onto a different receiver surface by the application of pressure to provide said receiver surface with a protected image.

The present invention is an advance over the prior art in that it provides an image transfer system which can be easily used without the use of special equipment to transfer virtually any type of image such as is produced by printing, silk-screening, stenciling, electrography, electrophotography, and xerography to virtually any receiver surface without the need to specially treat the receiver surface.

The present invention provides a method of transferring an image to a receiver surface to form imaged articles with protected messages which are not subject to adverse environmental effects such as physical and chemical contact, and are not capable of being smeared or rubbed off.

In a preferred embodiment of the present invention a unique radiation-curable fluorine-containing abherent coating composition, such as is disclosed in Applicants' commonly assigned copending application, Ser. No. 151,644 entitled "Compositions for Providing Abherent Coatings" filed of even date herewith, incorporated herein by reference, provides particularly preferred release surfaces. These release coatings are particularly preferred for a number of reasons. Firstly, these cured coating compositions provide abherent surfaces which can carry an image, in particular, a fused xerographic image, which is not easily smeared, such as by finger pressure, but is easily removed with an adhesive coated article.

Secondly, the particularly preferred release coating compositions provide cured coatings having a surprisingly high degree of abhesiveness, although only a relatively small amont of polyfluorinated arcylate compound, which is generally much more expensive than the polymeric binder, is utilized. Thus, the particularly preferred release coating compositions function as a unique and comparatively inexpensive replacement for costly fluoropolymers sometimes used to provide abherent release surfaces.

Thirdly, the particularly preferred release coating compositions once coated on a suitable substrate and radiation cured, adhere tenaciously to the substrate and are not easily removed.

Finally, the particularly preferred release coating compositions can be cured without the need for thermal polymerization processes. Thus the energy required to use the compositions is minimal and the polymerizable materials and substrates are not required to be heat insensitive.

For a general understanding of this invention, reference is made to the figure, wherein the sequential flow of steps is illustrated. The invention employs a release coated support to first receive the image to be transferred. Suitable support surfaces onto which the release coatings are applied include paper, metal, e.g., aluminum, and plastics, e.g. polyethylene, polyester, and polyvinylchloride. In order to coat some substrates such as polyester films, it is necessary to use primers, as is well known in the art. The preferred support surface is paper, e.g., clay coated Kraft ® paper available from the Boise Cascade Co.

Useful release coatings releasably hold printed or fused xerographic images on the surface thereof until such time as it is to be released onto an adhesive coated substrate. Suitable release coatings are well known in the art and include silicone and fluorocarbon compositions. Examples of useful silicone release surfaces include silicone release paper commercially available as "SCW-1" from Smith Paper Company; NS62 Buff® UBL 250-1 from Akrosil; and paper or film which is first coated with a layer of polyethylene and then overcoated with a silicone release agent, commercially available as Polyslik ® SH8004, from H. P. Smith Co.

The particularly preferred release coating is the radiation cured solvent-resistant adhesive coating provided by the radiation curing of a composition comprising:
 (a) a polyfluorinated acrylate compound;
 (b) a polyethylenically unsaturated crosslinking agent; and
 (c) a film-forming organic polymer.

The polyfluorinated acrylate compound should contain sufficient fluorine to provide the total composition with at least about 0.05% by weight fluorine. This minimum amount of fluorine is necessary to provide suitable abhesive characteristics.

Polyfluorinated acrylate compounds particularly suitable for use in the radiation curable coating compositions are polyfluorinated alkyl acrylates and methacrylates, and poly(fluorooxyalkylene)acrylates and methacrylates.

Preferred polyfluorinated alkyl acrylates and methacrylates have the general formula:

$$R_f\text{-}X\text{-}A \qquad \text{I}$$

wherein:
 $R_f$ is a polyfluorinated saturated, monovalent, nonaromatic, aliphatic radical that is straight, branched or cyclic;

A is an ethylenically unsaturated group having the formula:

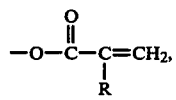   Ia

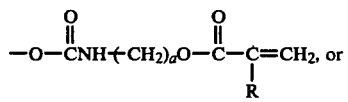   Ib

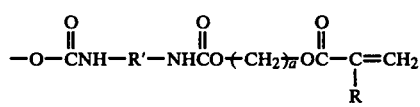   Ic wherein:
 R is hydrogen or methyl;
 a is an integer having a value of 2 to 6, and
 R' is a divalent aliphatic or cycloaliphatic group having 2 to 14 carbon atoms or an aryl group having 6 to 14 carbon atoms; and
X is a connecting group selected from the group consisting of:

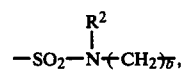   Id

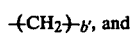, and   Ie

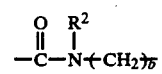   If wherein:
 b is 2 to 12 and b' is 1 to 12,
 $R^2$ is hydrogen, a lower alkyl of about 1 to 4 carbon atoms (preferably methyl or ethyl), or $-(CH_2)_c$-A, wherein A is defined above, and
 c is 2 or 3, and wherein when $R^2$ is $-(CH_2)_c$A, b is 2 or 3;
and when $R_f$ contains 6, 7, or more than 7 carbon atoms, there are no more than about 6, 10 or 20 atoms respectively in the chain between $R_f$ and the ester oxygen of the acrylate or methacrylate group.

Preferably, $R_f$ is fully fluorinated, however, desired release characteristics can be obtained with hydrogen or chlorine atoms present as substituents in the radical provided that not more than one atom of either is present for every two carbon atoms in the radical. $R_f$ preferably contains 6 to 14 carbon atoms, and most preferably, about 8 to 10 carbon atoms.

The preferred compounds of Formula I are those compounds in which the connecting group X is

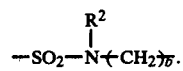   (Id)

The compounds of Formula I are prepared by the reaction of an $R_fOH$, such as a fluoroalkylsulfonamidoalkanol, a fluoroalkyanol, or a fluoroalkylcarbonamidoalkanol, with the halide, anhydride, or lower alkyl ester or acrylic or methacrylic acid, an isocyanatoalkyl acrylate or methacrylate, or the reaction product of one mole of an organic diisocyanate and one mole of a hydroxyalkyl acrylate or methacrylate.

Examples of compounds of Formula I in which X is of the Formula Id and A is of the Formula Ia are disclosed in U.S. Pat. No. 2,803,615. Examples include:
- 3-(N-methylperfluorooctanesulfonylamido)propyl acrylate,
- 2-(N-ethylperfluorooctanesulfonylamido)ethyl acrylate (NEF), 2-(N-ethylperfluorooctadecanesulfonylamido)ethyl acrylate, and 4-(N-butylperfluorohexanesulfonylamido)butyl methacrylate.

Examples of compounds of Formula I in which X is of the Formula Id and A is of the Formula Ib or Ic include:
- 3-(N-ethylperfluorodecanesulfonamido)propyl 2-acryloyloxyethylcarbamate,
- 2-(N-ethylperfluorodecanesulfonamido)ethyl 2-acryloyloxyethylcarbamate, Examples of compounds of Formula I in which X is of the Formula Ie and A is of the Formula Ib or Ic include:
- perfluoroheptylmethyl 2-acryloyloxyethylcarbamate,
- perfluorononylmethyl 2-methyacryloyloxypropylcarbamate, and

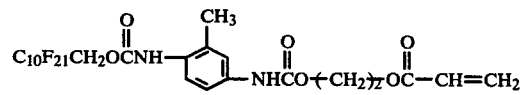

Examples of compounds of Formula I in which X is of the Formula If and A is of the Formula Ia, Ib or Ic include:
- 2-(perfluoroheptylcarbonamido)ethyl acrylate,

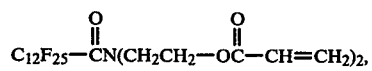

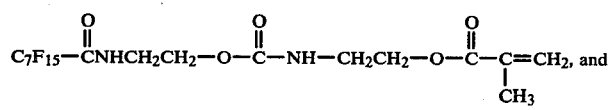

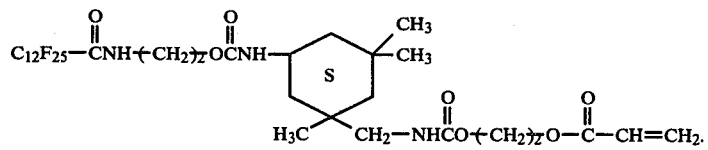

Preferred poly(fluorooxyalkylene)acrylates and

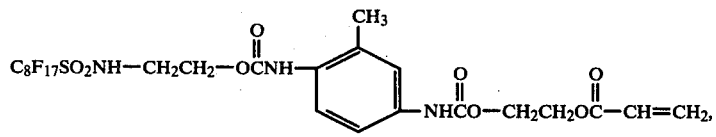

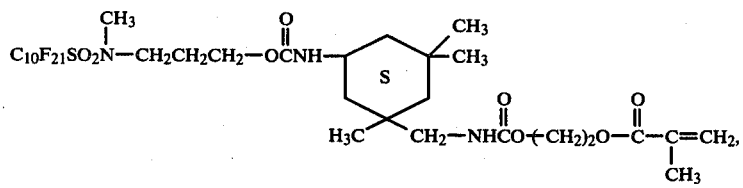

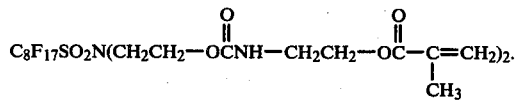

Examples of compounds of Formula I in which X is of the Formula Ie and A is of the Formula Ia are disclosed in U.S. Pat. Nos. 2,642,416; 3,384,627; 3,419,602; 3,719,698; 3,981,928; 3,102,103; 3,171,861; and 3,818,074. Examples include:
- 3-perfluorooctylpropyl acrylate,
- perfluoroheptylmethyl acrylate,
- 12-perfluorooctyldodecyl methacrylate,
- 6-perfluorodecylhexyl acrylate,
- 3-perfluorooctyl-2-chloropropyl acrylate,
- 3-perfluorooctylpentyl methacrylate, and
- 1,2,2-trihydro-1-methylheneicosafluorododecyl acrylate.

methacrylates have the general formula:

$$Z-R_f^2-Y-A \qquad \text{II}$$

wherein:
A is as it was defined for Formula I, i.e. Formulas Ia, Ib and Ic;
Y is —CH$_2$— or

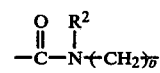

wherein:

b is 2 to 12, $R^2$ is hydrogen, a lower alkyl of about 1 to 4 carbon atoms (preferably methyl or ethyl), or $+CH_2+_cA$, wherein A is defined above, c is 2 or 3, and wherein when $R^2$ is $+CH_2+_cA$, b is 2 or 3;

$R_f^2$ is a divalent poly(fluorooxyalkylene) group having a number average molecular weight of from about 500 to 20,000 or higher and, preferably, about 2,000 to 10,000, as disclosed in U.S. Pat. No. 3,810,874; and Z is $CF_3O—$, $CF_3OCF(CF_3)O—$ or —Y—A, where Y and A are defined as they were above.

$R_f^2$ preferably comprises highly fluorinated polyethers having randomly distributed units selected from $—CF_2O—$, $—CF_2CF_2O—$ and $—C_3F_6O—$, and may also have incorporated therein $—CF_2—CF_2—CF_2—CF_2—O—$, $—CF_2—$ and $—C_2F_4—$ groups. Examples of such $R_f^2$ backbones are disclosed in U.S. Pat. Nos. 3,250,807; 3,250,808; 3,505,229; 3,699,145; 3,810,874; 3,810,875; 3,814,741; and 3,882,193. Most preferably $R_f^2$ comprises the unit, $—CF_2+O—CF_2CF_2O)_m(CF_2O)_nCF_2—$ wherein m and n are whole numbers between 1 and 200 and designate the number of randomly distributed perfluorooxyethylene and perfluorooxymethylene backbone repeating subunits, respectively, and the ratio m/n is between about 0.2/1 and 5/1.

The compounds of Formula II are prepared by the reaction of a poly(fluorooxyalkylene)methanol or a poly(fluorooxyalkylene)aminoalkanol with the halide, anhydride, or lower alkyl ester of acrylic or methacrylic acid, an isocyanatoalkyl acrylate or methacrylate, or the reaction product of one mole of an organic diisocyanate and one mole of a hydroxy alkyl acrylate or methacrylate.

Examples of compounds of Formula II wherein Y is $—CH_2—$, A is of the Formula Ia, and Z is $CF_3O—$ or $CF_3OCF(CH_3)O—$, are disclosed in U.S. Pat. No. 3,814,741 and include:

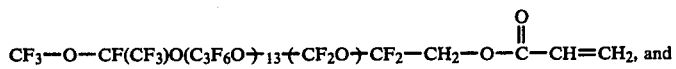

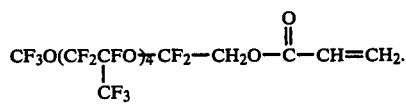

Examples of compounds of Formula II wherein Y is $—CH_2—$, A is of the Formula Ib or Ic, and Z is $CF_3O$ or $CF_3OCF(CF_3)O—$ include:

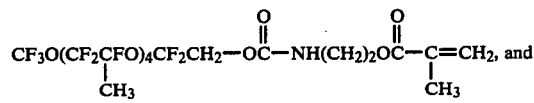

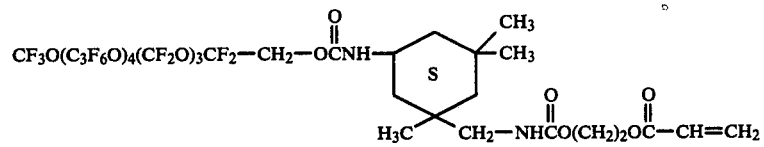

Examples of compounds of Formula II wherein Y is of the Formula If, A is of the Formula Ia, Ib or Ic, and Z is $CF_3O—$ or $CF_3OCF(CF_3)O—$ include:

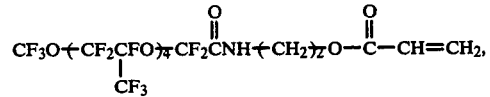

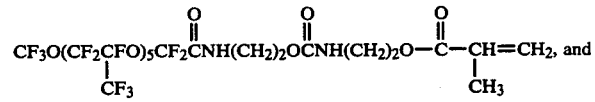

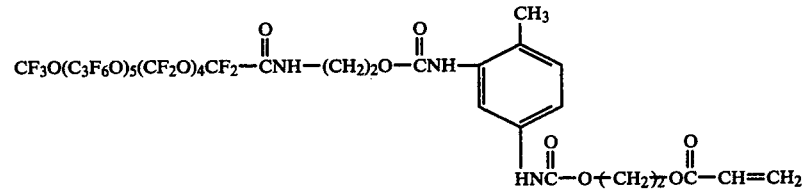

Examples of compounds of Formula II wherein Y is $—CH_2—$ or of the Formula If, A is of the Formula Ia, Ib or Ic, and Z is —Y—A, where Y and A are defined as they were hereinabove, include:

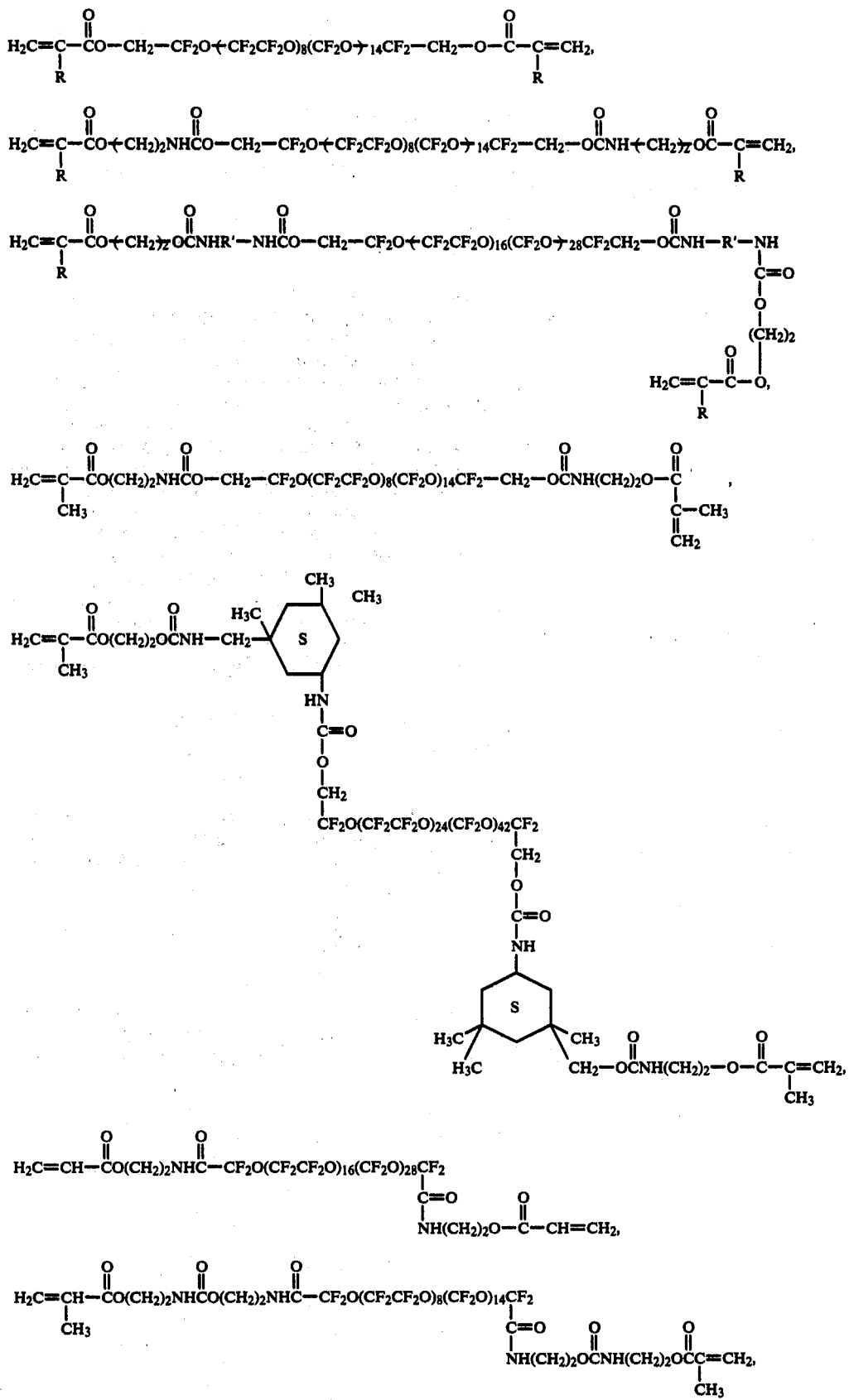

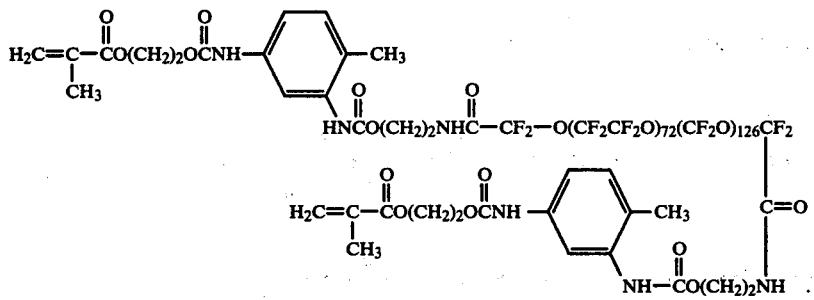

Particularly preferred poly(fluorooxyalkylene) acrylates and methacrylates are compounds of Formula II wherein A is

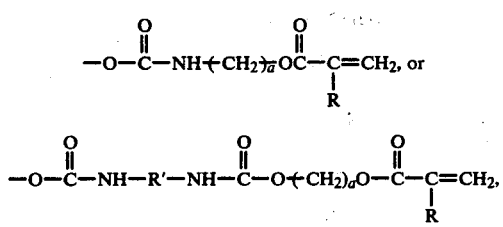

wherein a, R, and R' are defined as above. These compounds belong to the class of poly(fluorooxyalkylene)urethane acrylate compounds, and are believed to be novel. Exemplary of these novel urethane methacrylate compounds are:

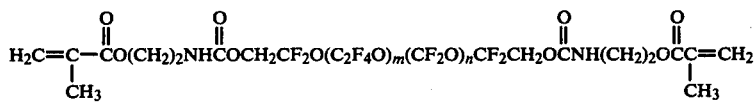

wherein m/n has an average value of about 0.5, and wherein the compound has a number average molecuar weight of about 4690;

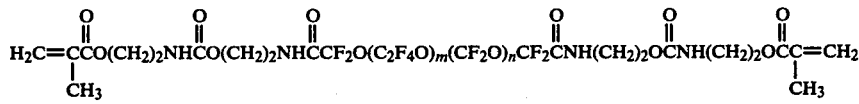

wherein m/n has an average value of about 0.6, and wherein the compound has a number average molecular weight of about 2310; and

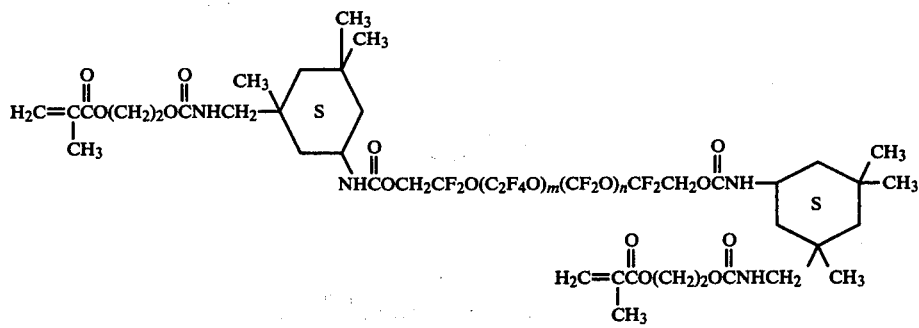

wherein m/n has an average value of 0.5, and the number average molecular weight of the compound is about 5450. These compounds are preferred because they are easier to prepare, and therefore more economical, more compatible with the other components of the radiation curable compositions of the invention, and they are generally highly reactive therewith.

Exemplary polyethylenically unsaturated crosslinking agents for inclusion in the radiation curable compositions of the present invention include acrylic, and methacrylic substituted compounds having an acrylic equivalent weight of about 63 to 275, preferably about 85 to 200 and more preferably about 100 to 150. Such agents are well-known and are listed, for example, in U.S. Pat. Nos. 3,833,384; 3,885,964; and 4,037,021. Preferred crosslinking agents include acrylic anhydride, methacrylic anhydride, the polyacrylate and polymethacrylate esters of alkanepolyols, and the polyacrylate and polymethacrylate esters of isocyanurate and s-triazines (e.g., tris(2-acryloyloxyethyl)isocyanurate, available as "SR ®-368" from the Sartomer Co., West Chester, PA, and 1,3,5-tri(2-methacryloxyethyl)-s-triazine).

Film-forming polymers suitable for use in the compositions of the invention are generally thermoplastic organic polymers containing carbon and hydrogen and optionally oxygen, nitrogen and halogens, i.e., chlorine. In order to be of use in the present invention the film-forming polymer must be compatible and dispellable with the polyfluorinated acrylate compound. Suitable polymers are those polymers that:
1. are soluble in tetrahydrofuran; and
2. do not exhibit immediate phase separation when the polyfluorinated acrylate compound is dispelled into a solution of the polymer in tetrahydrofuran.

Examples of suitable polymers include: polyesters, e.g. polyethylene terephthalate; copolyesters, e.g. polyethylene terephthalate isophthalate; polylactones, e.g. polycaprolactone; polyamides, e.g. polyhexamethylene adipamide; vinyl polymers, e.g. poly(vinyl acetate/methyl acrylate), poly(vinylidene chloride/vinyl acetate); polyolefins, e.g. polystyrene; polydienes, e.g. poly(butadiene/styrene); polyacrylates, e.g. poly(methyl methacrylate/ethyl acrylate), poly(methyl acrylate/acrylic acid); polyurethanes, e.g. reaction products of aliphatic, cycloaliphatic or aromatic diisocyanates with polyester glycols or polyether glycols; and cellulosic derivatives, e.g. cellulose ethers such as ethyl cellulose esters such as cellulose acetate/butyrate.

When polyfluorinatedalkyl acrylates and methacrylates, such as those described by Formula I are utilized, there is preferably about 1 to 70 percent by weight of polyfluorinated acrylate material, 10 to 62 percent by weight of polyethylenically unsaturated crosslinking agent, and 5 to 85 percent by weight of film-forming organic polymer; more preferably there is about 3 to 45 percent by weight acrylate material, 15 to 50 percent by weight crosslinking agent and 30 to 80 percent by weight polymer; and most preferably there is about 5 to 25 percent by weight polyfluorinated acrylate material, 20 to 30 percent by weight crosslinking agent and 50 to 70 percent by weight polymer.

When the poly(fluorooxyalkylene)acrylates and methacrylates, such as those described by Formula II are utilized, there is preferably about 0.1 to 20 percent by weight of the polyfluorinated acrylate material, 5 to 80 percent by weight of the crosslinking agent, and 5 to 85 percent by weight of the polymer; more preferably there is about 0.15 to 10 percent by weight of the polyfluorinated acrylate material, 15 to 50 percent by weight of the crosslinking agent and 30 to 80 percent by weight of the polymer; and most preferably there is about 0.2 to 5 percent by weight of the polyfluorinated acrylate material, 20 to 30 percent by weight of the polyfluorinated crosslinking agent and 50 to 70 percent by weight of the polymer.

"Preferred" indicates that the general range of components provide radiation cured release surfaces having good release of images applied to their surfaces via the process of the present invention, although certain compositions may be characterized by curling and brittleness.

"More preferred" indicates that the general range of components provide radiation cured release surfaces having good release of images, although certain compositions are characterized by having little brittleness and slight curl.

"Most preferred" indicates that the general range of components provide radiation cured release surfaces having good release of images and essentially no brittleness or curling.

The particularly preferred coating compositions are preferably prepared by dispelling the film-forming polymer, the polyethylenically unsaturated crosslinking agent, and the polyfluorinated acrylate compound in a suitable solvent. A particularly preferred method of preparing the coating composition is by first dissolving the polymer in a suitable solvent and then adding the crosslinking agent and the polyfluorinated acrylate compound to the solution. Generally, solutions having concentrations of solids of 20 to 40 percent by weight are preferred, although higher or lower concentrations can be used, depending upon whether the viscosity of the solution is suitable for coating onto a substrate. The preferred solvent is tetrahydrofuran. Other suitable solvents include dimethyl formamide, cyclohexanone, methyl isobutyl ketone, methyl ethyl ketone, and similar polar aprotic solvents.

Various additives, such as coating aids, wetting agents, flatting agents, dyes, ultraviolet absorbers, pigments (particularly clays), particulate materials, e.g., microspheres and microballoons, can be added to the particularly preferred coating compositions of the invention in amounts and for purposes that are well known. Monoethylenically unsaturated compounds can also be incorporated to modify the flexibility and image adhesion properties of the abhesive coatings. Examples of such modifying compounds include vinyl benzoate, methacrylic acid, acrylamide, dimethyl itaconate, octyl acrylate, 2-ethylhexyl acrylate, dodecyl methacrylate, octadecyl acrylate, and the like.

When visible light or ultraviolet radiation is used to cure the particularly preferred coating compositions, it is generally necessary to include a source of free radicals, i.e. a material which liberates free radicals on exposure to radiation. Such free radical sources are well known and are described in the art, e.g. "Photochemistry" by Calvert and Pitts, John Wiley & Sons, Chapter II (1966). For example, when ultraviolet radiation is utilized suitable sources of free radicals include such compounds as acyloin and derivatives thereof, e.g. benzoin ethyl ether. Other sources of free radicals are disclosed in U.S. Pat. Nos. 3,887,450; 3,895,949; 4,043,819; 3,729,313; and 4,058,401. The free radical source can be used in amounts ranging from about 0.01 to 5 percent and preferably about 0.25 to 1.0 percent by weight of the total composition.

When visible light is utilized as the source of actinic radiation it is generally necessary that the particularly preferred radiation curable coating composition also contain, in addition to the free radical source, a sensitizer capable of absorbing radiation of a wavelength present in the visible light and transferring the absorbed energy to the free radical source. Suitable sensitizers include cyanine, merocyanines, styryl and like dyes such as are described in U.S. Pat. No. 3,099,558.

The coating compositions may be applied to the first support base by any of the techniques known in the art, such as, for example, spray, brush, dip, knife, curtain and the like coating processes.

The particularly preferred coating composition is preferably coated on the first support base by applying a layer of the composition in a solvent to the support base, removing the solvent and exposing the layer to actinic radiation to provide a cured abherent release coating. Suitable sources of actinic radiation include visible light, ultraviolet, laser beam, electron beam, X-rays, gamma rays and the like. Preferably, the coating is cured by exposure to an electron beam such as is provided by electron-curtain processors. Examples of such processors are the "Electro-curtain II Series" available from Energy Sciences, Inc., Woburn, Massachusetts, and the "Dynamitron EBX" available from Radiation Dynamics, Inc., Melville, New York.

According to the method of the present invention, the image to be transferred may be applied to the release coated surface of the first support base by a variety of means such as xerographic printing, silk screening, stenciling and other mechanical, electrical or chemical techniques such as electrography, and electrophotography.

The particularly preferred release coating compositions, are of particular use when the imaging means is xerographic, since they are able to carry a fused xerographic image which is not easily smeared.

The second support base which is contacted with the imaged first support base can comprise a transparent, translucent, or opaque material which is coated with either a pressure sensitive adhesive or a latent adhesive surface. The second support base can be selected from materials such as are suitable for the first support base including paper, metals, e.g., aluminum, and plastics, e.g., polyethylene, polyester, and polyvinylchloride. Exemplary of useful pressure sensitive adhesives are polyacrylate adhesives, such as 3M "Magic Mending Tape", a repositionable microsphere acetate tape, commercially available as "No. 811 Repositionable Transparent Tape" from 3M, Kraton ® rubber adhesives, available from the Shell Corp., and natural rubber adhesives. Exemplary of useful latent adhesives is the friction activatable adhesive disclosed in U.S. Pat. No. 4,066,600.

The pressure sensitive adhesive surface or activated latent adhesive surface of the second support base is applied to the imaged first support base, and pressure, such as finger pressure, is applied to the composite structure. When the second support base is separated from the first support base the image originally applied to the release coated first support base is transferred to the adhesive layer on the second support base. The particularly preferred release coatings enable an image, in particular, a fused xerographic image, which has been applied to the coating to be removed completely by the adhesive surface of the second base support.

The second support base bearing the image may be used in a variety of applications such as labels, decals, transparencies, appliques, and other informative displays, on receiver surfaces. Typical receiver surfaces include walls, automobiles, windows, stats, books, etc. The adhesive coated, image bearing surface of the second support base is applied to the receiver surface. The second support base adheres to the receiver surface and provides the receiver surface with a protected message. Where the receiver surface is a transparent or translucent surface, such as a window, and the protected image is to be viewed through the receiver surface, the second support base may be transparent, translucent or opaque. Where the receiver surface is opaque and the protected image is to be viewed through the second support base, the second support base must be transparent or translucent.

EXAMPLES 1–36

Mixtures of N-ethylheptadecafluorooctanesulfonamidoethyl acrylate (NEF), tris(2-acryloxyethyl)-isocyanurate, available as SR ®-368 from the Sartomer Co., and polyesterurethane, available as E625M ® from the Thiokol Corp. were prepared according to the procedures described hereinabove. The components were dissolved in sufficient tetrahydrofuran to provide a readily coatable solution. Each solution was knife coated (2 ml orafice) onto clay coated Kraft paper (78 lbs.) available from the Boise Cascade Co. Following solvent evaporation, the coated papers were radiation cured by exposure to accelerated electrons in an electron curtain processor to 16 MRad at 175 Kev. Each release coated paper was imaged with a fused xerographic image by use of bond paper copiers, "Secretary II" available from 3M. An acrylic based pressure sensitive adhesive, 3M "Magic Mending Tape," was applied to the imaged surface, followed by rubbing in the area of the image and removal of the tape, now bearing the image.

Table I illustrates the coating compositions and their use in the image and transfer process of the present invention. The column of Table I entitled "Image and Transfer" indicates the quality of the resultant image on the pressure sensitive adhesive tape, i.e., the uniformity of image density, and the tendency for the image to smear.

The columns of Table I entitled "Curled" and "Brittle" indicate whether the paper coated with the particular release coating curled or became brittle after it passed through the bond paper copier.

TABLE I

Release Coating Composition and Operation

| Example No. | NEF (% by wt.) | E625M ® (% by wt.) | SR ®-368 (% by wt.) | Image and Transfer | Curled | Brittle |
|---|---|---|---|---|---|---|
| 1 | 3.0 | 44.5 | 52.5 | Good | Yes | Yes |
| 2 | 4.0 | 66.0 | 30.0 | Good | Slightly | No |
| 3 | 5.0 | 80.0 | 15.0 | Good | No | No |
| 4 | 5.0 | 75.0 | 20.0 | Good | No | No |
| 5 | 5.0 | 70.0 | 25.0 | Good | Slightly | No |
| 6 | 5.0 | 60.0 | 35.0 | Good | Slightly | No |
| 7 | 5.0 | 55.0 | 40.0 | Good | Slightly | No |
| 8 | 7.0 | 63.0 | 30.0 | Good | Slightly | No |
| 9 | 7.0 | 44.5 | 48.5 | Good | Slightly | No |
| 10 | 10.0 | 80.0 | 10.0 | Good | No | No |
| 11 | 10.0 | 75.0 | 15.0 | Good | No | No |
| 12 | 10.0 | 70.0 | 20.0 | Good | No | No |
| 13 | 10.0 | 60.0 | 30.0 | Good | No | No |
| 14 | 10.0 | 55.0 | 35.0 | Good | Slightly | No |
| 15 | 10.0 | 65.0 | 25.0 | Good | No | No |
| 16 | 10.0 | 30.0 | 60.0 | Good | Yes | Yes |
| 17 | 15.0 | 65.0 | 20.0 | Good | No | No |
| 18 | 15.0 | 60.0 | 25.0 | Good | Yes | Yes |
| 19 | 15.0 | 55.0 | 30.0 | Good | No | No |
| 20 | 15.0 | 35.0 | 50.0 | Good | Yes | Yes |
| 21 | 20.0 | 60.0 | 20.0 | Good | Slightly | No |
| 22 | 20.0 | 55.0 | 25.0 | Good | No | No |
| 23 | 20.0 | 50.0 | 30.0 | Good | No | No |
| 24 | 25.0 | 35.0 | 40.0 | Good | Yes | No |
| 25 | 25.0 | 30.0 | 45.0 | Good | Yes | SL. |
| 26 | 30.0 | 55.0 | 15.0 | Good | Slightly | No |
| 27 | 30.0 | 40.0 | 30.0 | Good | Slightly | No |
| 28 | 35.0 | 44.5 | 20.5 | Marginal | No | No |
| 29 | 40.0 | 40.0 | 20.0 | Good | Slightly | No |
| 30 | 40.0 | 30.0 | 30.0 | Good | Slightly | No |
| 31 | 20.0 | 60.0 | 20.0 | Good | Yes | Yes |
| 32 | 30.0 | 60.0 | 10.0 | Good | Yes | Yes |
| 33 | 50.0 | 10.0 | 40.0 | Good | No | No |
| 34 | 60.0 | 20.0 | 20.0 | Good | Yes | No |
| 35 | 60.0 | 30.0 | 10.0 | Good | Yes | Yes |
| 36 | 70.0 | 15.0 | 15.0 | Good | Yes | Yes |

Good - 100% of the fused xerographic image was transferred to the tape.
Marginal - 90% of the image was transferred.

EXAMPLES 37–49

Release surfaces were obtained or prepared according to the procedures described hereinbelow. The release coating components of Examples 37–41 and 47–49 (see Table II) were dissolved in tetrahydrofuran, knife coated onto clay-coated Kraft paper, and radiation cured, as in Examples 1–36. The release surfaces of Examples 42–46 were obtained from the sources indicated in Table II.

Each release was imaged with a fused xerographic image by use of a bond paper copier (the type of copier is indicated in Table II). 3M "Magic Mending Tape" was applied to the imaged surface and the image was transferred to the tape, according to the procedures of Examples 1–36.

Table II illustrates the quality of the transfer achieved with various bond paper copiers and release surfaces.

TABLE II

Quality of Transfer vs. Copier Type and Release Surface

| Example No. | IBM Copier II | Eastman Ektaprint | 3M Secretary II | 3M Secretary III | 3M DDS Platemaker | Release Surface | Quality of Transfer |
|---|---|---|---|---|---|---|---|
| 37 | X | | | | | a | clean[h] |
| 38 | | X | | | | a | clean |
| 39 | | | X | | | a | clean |
| 40 | | | | X | | a | clean |
| 41 | | | | | X | a | clean |
| 42 | X | | | | | b | marginal[i] |
| 43 | | X | | | | b | marginal |
| 44 | | | X | | | b | marginal |
| 45 | | | | | X | c | clean |
| 46 | | | | | X | d | marginal |
| 47 | | | | | X | e | clean |
| 48 | | | | | X | f | clean |
| 49 | | | | | X | g | clean |

Footnotes

[a]300 parts of 20 percent polyesterurethane (E625M ® available from Thiokol Corp.) in tetrahydrofuran, 30 parts of SR ®-368 (available from Sartomer) and 10 parts of NEF.
[b]Silicone release paper available as "SCW-1" from Smith Paper Company.
[c]Silicone release paper, PolySlik® SH8004, available from H-P-Smith Co.
[d]Silicone release paper, NS 62 Buff® UBL 250-1, available from Akrosil Co.
[e]0.3 percent

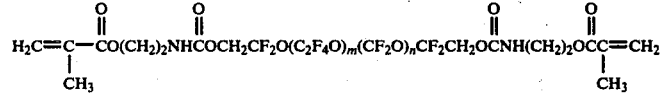

wherein m/n has an average value of about 0.5, and wherein the compound has a number average molecular weight of about 4690; 66.5 percent polyesturethane, available as E625M® from the Thiokol Corp.; and 33.2 percent tris(2-acryloxyethyl)-isocyanurate available as SR® 368 from the Sartomer Co.

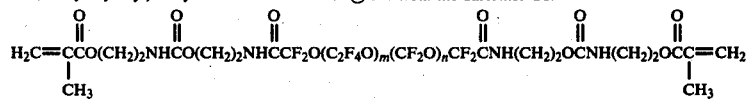

wherein m/n has an average value of about 0.6 and wherein the compound has a number average molecular weight of about 2310; 66.57 percent E625M ®; and 33.28 percent SR ® 368.
[g]0.6 percent

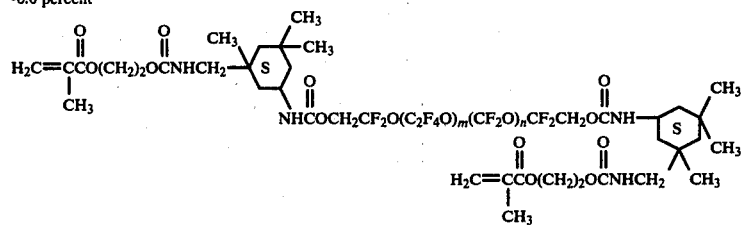

wherein m/n has an average value of about 0.5 and the number average molecular weight of the compound is about 5450; 66.3 percent E625M ®, and 33.1 percent SR ® 368.
[h]100% of fused xerographic image was transferred to the tape
[i]90% of the image was transferred

What is claimed is:

1. An image transfer process for transferring an image from a release surface onto a different surface comprising the steps of
   (a) applying an image to a release coated surface of a first support, said release coating being a radiation curable composition for providing solvent-resistant adhesive coatings comprising:
      a polyfluorinated monomeric acrylate compound;
      a polyethylenically unsaturated crosslinking agent; and
      a film-forming polymer; which is radiation cured after it is coated on said first support base;
   (b) adhering an adhesive surface of an adhesive coated second support base over said image on said release coated surface of said first support base;
   (c) applying sufficient pressure to said second support base to effect intimate contact between said adhesive surface of said second support base and said image on said release coated surface of said first support base;
   (d) separating said image bearing first support base from said second support base, with said image being transferred to said adhesive layer of said second support base; and
   (e) securing said adhesive layer of said second support base, now bearing said image, onto a different receiver surface by the application of pressure to provide said receiver surface with a protected image;

wherein said second support base and said receiver surface may be transparent, translucent or opaque surfaces, provided that where said receiver surface is an opaque surface, said second support base is a transparent or translucent surface.

2. The process of claim 1 wherein said first support base is selected from the group consisting of paper, plastic and metal.

3. The process of claim 1 wherein said polyfluorinated acrylate compound is selected from the group consisting of a polyfluorinated alkyl acrylate and a polyfluorinated alkyl methacrylate having the general formula $$R_f\text{—X—A}$$

wherein:
$R_f$ is a polyfluorinated, saturated monovalent, aliphatic radical;
A is an ethylenically unsaturated group selected from the group consisting of

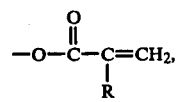

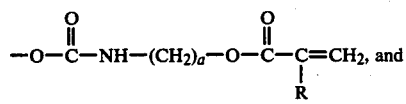

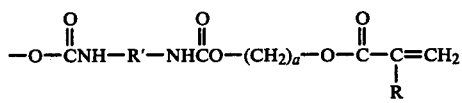

wherein:
R is selected from the group consisting of hydrogen and methyl,
a is 2 to 6, and
R' is selected from the group consisting of a divalent aliphatic group having 2 to 14 carbon atoms, a divalent cycloaliphatic group having 2 to 14 carbon atoms, and an aryl group having 6 to 14 carbon atoms; and
X is a connecting group selected from the group consisting of

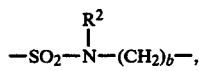

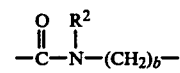

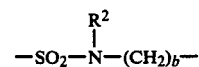

wherein:
b is 2 to 12, b' is 1 to 12, and
$R^2$ is selected from the group consisting of hydrogen, a lower alkyl of 1 to 4 carbon atoms and $\text{—(CH}_2\text{)}_c\text{A}$ wherein A is defined as said A hereinabove,
c is 2 or 3, and wherein when $R^2$ is $\text{—(CH}_2\text{)}_c\text{A}$, b is 2 or 3; and
wherein:
when $R_f$ contains 6, 7 or more than 7 carbon atoms there are 6 or fewer, 10 or fewer, or 20 or fewer atoms respectfully in the chain between $R_f$ and A.

4. The process of claim 3 wherein said polyfluorinated alkyl acrylate or methacrylate is present in a concentration of about 1 to 70 percent by weight of said composition.

5. The process of claim 3 wherein said $R_f$ is a perfluorinated radical containing 6 to about 14 carbon atoms.

6. The process of claim 3 wherein said X is $$-SO_2-\overset{R^2}{\underset{|}{N}}-(CH_2)_b-$$

wherein $R^2$, and b are defined as said $R^2$ and said b, hereinabove.

7. The process of claim 6 wherein said polyfluorinated alkyl acrylate or methacrylate is selected from the group consisting of:
3-(N-methylperfluorooctanesulfonylamido)propyl acrylate,
2-(N-ethylperfluorooctanesulfonylamido)ethyl acrylate,
2-(N-ethylperfluorooctadecanesulfonylamido)ethyl acrylate,
4-(N-butylperfluorohexanesulfonylamido)butyl methacrylate,
3-(N-methylperfluorooctanesulfonamido)propyl 2-acryloyloxyethylcarbamate,
2-(N-ethylperfluorodecanesulfonamido)ethyl 2-acryloyloxyethylcarbamate,

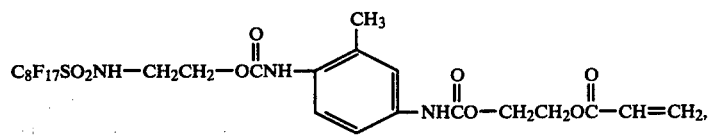

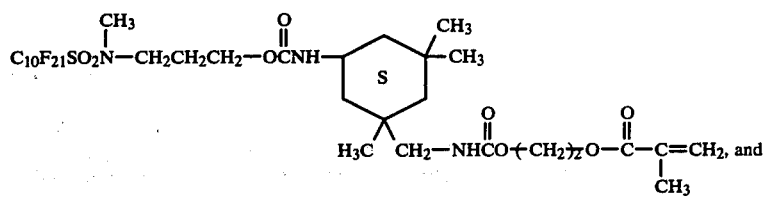

-continued

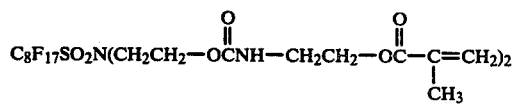

8. The process of claim 1 wherein said polyfluorinated acrylate compound is selected from the group consisting of poly(fluorooxyalkylene)acrylate or methacrylate having the general formula $$Z-R_f^2-Y-A$$

wherein:
$R_f^2$ is a divalent poly(fluorooxyalkylene) group having a number average molecular weight of from about 500 to 20,000;
A is an ethylenically unsaturated group selected from the group consisting of

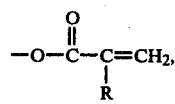

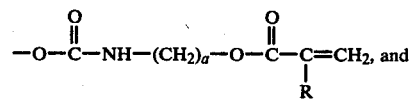

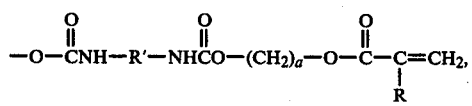

wherein
R is selected from the group consisting of hydrogen and methyl, a is an integer having a value of 2 to 6, and R' is selected from the group consisting of a divalent aliphatic or cycloaliphatic group having 2 to 14 carbon atoms and an aryl group having 6 to 14 carbon atoms;
Y is selected from the group consisting of —CH$_2$— and

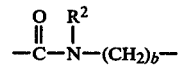

wherein
b is 2 to 12, $R^2$ is selected from the group consisting of hydrogen, a lower alkyl of about 1 to 4 carbon atoms, and (CH$_2$)$_c$A, wherein A is defined as said A hereinabove, c is 2 or 3, and wherein when $R^2$ is (CH$_2$)$_c$A, b is 2 or 3; and
Z is selected from the group consisting of CF$_3$O—, CF$_3$OCF(CF$_3$)O—, and —Y—A, wherein Y and said A are defined as said Y and A hereinabove.

9. The process of claim 8 wherein said poly(fluorooxyalkylene)acrylate or methacrylate is present in a concentration of about 0.1 to 20 percent by weight of said composition.

10. The process of claim 8 wherein $R_f^2$ comprises a highly fluorinated polyether having randomly distributed units selected from the group consisting of —CF$_2$O—, —CF$_2$CF$_2$O—, —C$_3$F$_6$O—, —CF$_2$—CF$_2$—CF$_2$—CF$_2$—O—, —CF$_2$—, —C$_2$F$_4$— and combinations thereof.

11. The process of claim 10 wherein said $R_f^2$ comprises the unit

wherein m and n are whole numbers between 1 and 200 and the ratio m/n is between about 0.2/1 and 5/1.

12. The process of claim 2 wherein said poly(fluorooxyalkylene)urethane methacrylate is selected from the group consisting of

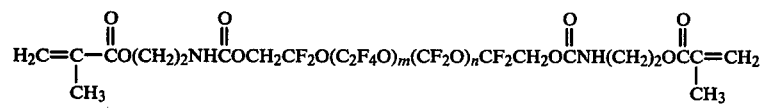

wherein:
m/n has an average value of about 0.5, and the number average molecular weight of the compound is about 4690;

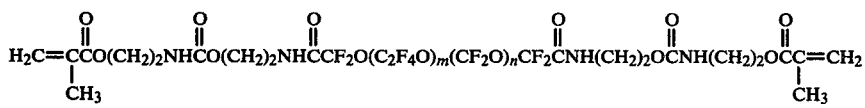

wherein:
m/n has an average value of about 0.6, and the number average molecular weight of the compound is about 2310;

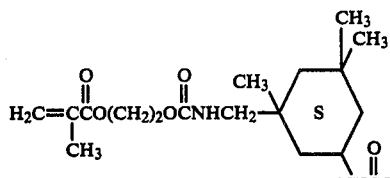 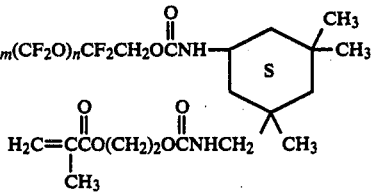

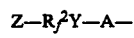

wherein:

m/n has an average value of about 0.5, and the number average molecular weight of the compound is about 5450.

13. The process of claim 1 wherein said polyethylenically unsaturated crosslinking agent is selected from the group consisting of acrylic and methacrylic substituted compounds having an acrylic equivalent weight of about 63 to 275.

14. The process of claim 1 wherein said polyethylenically unsaturated crosslinking agent is present in a concentration of about 10 to 62 percent by weight of said composition.

15. The process of claim 1 wherein said film-forming polymer is a thermoplastic organic polymer which is dispellable with said polyfluorinated acrylate compound; and wherein said polymer is soluble in tetrahydrofuran and does not exhibit immediate phase separation when said polyfluorinated acrylate compound is dispelled into a solution of said polymer in tetrahydrofuran.

16. The process of claim 1 wherein said film-forming polymer is present in a concentration of about 5 to 85 percent by weight of said composition.

17. The process of claim 1 wherein said composition also comprises additives selected from the group consisting of coating aids, wetting agents, flatting agents, dyes, ultraviolet absorbers, pigments, particulate materials, monoethylenically unsaturated modifying compounds, and mixtures thereof.

18. The process of claim 1 wherein said composition also comprises a source of free radicals.

19. The process of claim 8 wherein said composition further comprises a sensitizer, said sensitizer being capable of absorbing radiation of a wavelength present in visible light and transferring the absorbed energy to said free radical source.

20. The process of claim 1 wherein said image is applied to said release coated surface of said first support base by means selected from the group consisting of xerography, printing, silk screening, stenciling, electrography, electrophotography and the like.

21. The process of claim 1 wherein said second support base is selected from the group consisting of paper, plastic and metal.

22. The process of claim 1 wherein said adhesive surface of said second support base is a pressure sensitive or latent adhesive.

23. An image transfer process for transferring an image from a release surface onto a different surface comprising the steps of (a) applying an image to a release coated surface of a first support base, said release coating being a radiation curable composition for providing solvent-resistant adhesive coatings comprising:

(1) a poly(fluorooxyalkylene)urethane acrylate or methacrylate having the general formula:

$$Z-R_f^2-Y-A-$$

wherein:

$R_f^2$ is a divalent poly(fluorooxyalkylene) group having a number average molecular weight of from about 500 to 20,000;

A is selected from the group consisting of

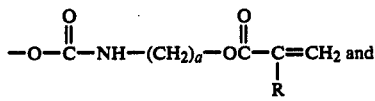

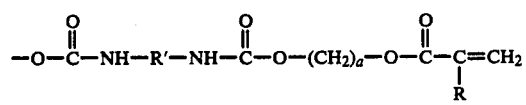

wherein:

R is selected from the group consisting of hydrogen and methyl, a is an integer having a value of 2 to 6, and R' is selected from the group consisting of a divalent aliphatic or cycloaliphatic group having 2 to 14 carbon atoms and an aryl group having 6 to 14 carbon atoms;

Y is selected from the group consisting of

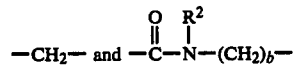

wherein:

b is 2 to 12, $R^2$ is selected from the group consisting of hydrogen, a lower alkyl of about 1 to 4 carbon atoms, and $-(CH_2)_c-A$, wherein C is 2 to 3, and wherein when $R^2$ is $-(CH_2)_c-A$, b is 2 or 3; and Z is selected from the group consisting of $CF_3O-$, $CF_3OCF(CF_3)O-$, $-Y-A$, and wherein Y and A are defined as said Y and said A hereinabove;

(2) a polyethylenically unsaturated crosslinking agent; and (3) a film-forming polymer; which is radiation cured after it is coated on said first support base;

(b) adhering an adhesive surface of an adhesive coated second support base over said image on said release coated surface of said first support base;

(c) applying sufficient pressure to said second support base to effect intimate contact between said adhesive surface of said second support base and said image on said release coated surface of said first support base;

(d) separating said image bearing first support base from said second support base, with said image being transferred to said adhesive layer of said second support base; and (e) securing said adhesive layer of said second support base, now bearing said image, onto a different receiver surface by the application of pressure to provide said receiver surface with a protected image;

wherein said second support base and said receiver surface may be transparent, translucent or opaque surfaces, provided that where said receiver surface is an opaque surface, said second support base is a transparent or translucent surface.

* * * * *